US007929012B2

(12) United States Patent
Fry et al.

(10) Patent No.: US 7,929,012 B2
(45) Date of Patent: Apr. 19, 2011

(54) METHOD AND ARCHITECTURE FOR DISTRIBUTED VIDEO SWITCHING USING MEDIA NOTIFICATIONS

(75) Inventors: Steven G. Fry, Oakland, CA (US); Thiyagesan Ramalingam, Milpitas, CA (US); Nermin Ismail, Fremont, CA (US); Walter Friedrich, Pleasanton, CA (US); Duanpei Wu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1479 days.

(21) Appl. No.: 11/327,541

(22) Filed: Jan. 5, 2006

(65) Prior Publication Data

US 2007/0153712 A1    Jul. 5, 2007

(51) Int. Cl.
*H04N 7/15* (2006.01)
(52) U.S. Cl. ...................................... 348/14.09; 370/260
(58) Field of Classification Search ............... 348/14.08, 348/14.09; 370/260, 263
See application file for complete search history.

(56) References Cited

U.S. PATENT DOCUMENTS

| 5,828,838 | A | 10/1998 | Downs et al. |
| 6,288,739 | B1 | 9/2001 | Hales et al. |
| 7,580,375 | B1 * | 8/2009 | Friedrich et al. ............... 370/260 |
| 7,688,764 | B2 * | 3/2010 | Dorenbosch et al. ......... 370/260 |
| 7,693,190 | B2 * | 4/2010 | Firestone et al. ............. 370/503 |
| 2005/0071440 | A1 * | 3/2005 | Jones et al. .................. 709/218 |
| 2007/0156924 | A1 * | 7/2007 | Ramalingam et al. ........ 709/246 |

* cited by examiner

*Primary Examiner* — Stella L Woo
(74) *Attorney, Agent, or Firm* — Fish & Richardson P.C.

(57) ABSTRACT

Disclosed are video conferencing systems, devices, architectures, and methods for using media notifications to coordinate switching between video in a distributed arrangement. An exemplary media switch in accordance with embodiments can include: a first interface configured for a first type communication with an endpoint; a second interface configured for the first type communication with another media switch, the second interface being configured to receive a first video stream having a first characteristic and a second video stream having a second characteristic; a third interface configured for a second type communication with a stream controller, the stream controller being configured to provide a notification; and a fourth interface configured for the second type communication with a controlling server, whereby the media switch is configured to re-target an active stream in response to the notification or a difference between the first and second characteristics.

31 Claims, 6 Drawing Sheets

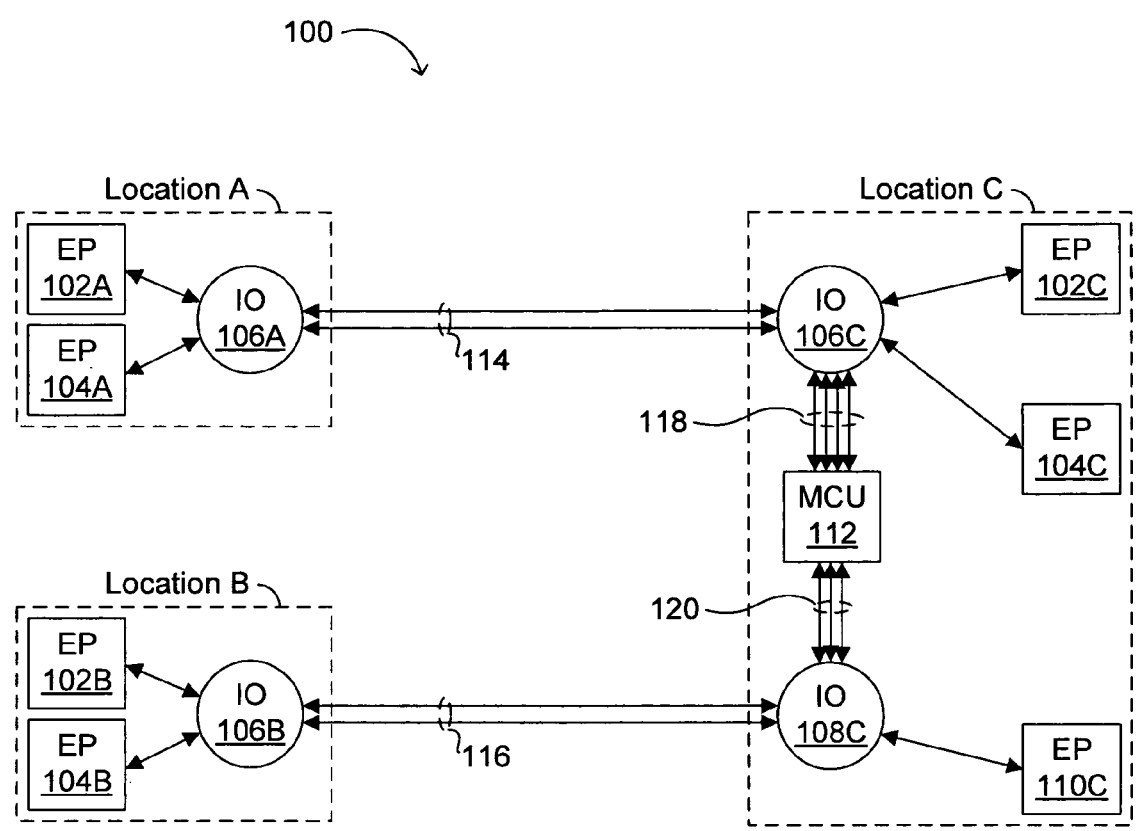
Figure 1 (conventional)

METHOD AND ARCHITECTURE FOR DISTRIBUTED VIDEO SWITCHING USING MEDIA NOTIFICATIONS

BACKGROUND OF THE INVENTION

This invention is related in general to video conferencing systems and more specifically to devices, systems, architectures, and methods for using media notifications to coordinate switching between video in a distributed arrangement.

In conventional video conferencing, typically all of the video screens are active when the conference is in session in a "continuous presence" mode of operation. However, newer methods don't send a conference participant's media representation into the network unless they are, for example, the loudest talking speaker. Such approaches aim to save bandwidth across the network because not all of the participants need to be seen in the conference. In fact, only video streams to be presented to other participants need be transmitted onto the network.

Referring now to FIG. 1, a block diagram illustrating a conventional centralized video conferencing control architecture is indicated by the general reference character 100. Location A may include endpoint (EP) 102A, EP 104A, and input/output (IO) 106A. Similarly, location B may include EP 102B, EP 104B, and IO 106B. Endpoints may represent particular conference rooms, for example. Communication channel 114 may connect location A with location C via IO 106C, which can also interface to EP 102C and EP 104C. Similarly, communication channel 116 may connect location A with location C via IO 108C, which can also interface to EP 110C. Multipoint control unit (MCU) 112 may interface with IO 106C via channel 118 and with IO 108C via channel 120.

Because IO systems 106A, 106B, 106C, and 108C are typically not fully dedicated or sufficiently adapted to accommodate video conferencing, system performance may suffer. Further, relatively large bandwidth may be required for communication channels 114 and 116. Even more bandwidth may be required for channels 118 and 120 due to the centralized MCU 112 configuration. In addition to possible bandwidth bottlenecks in this conventional approach, high speed and "smooth" video stream switching from a previous speaker to a new active speaker is not optimized.

BRIEF DESCRIPTION OF THE DRAWINGS

FIG. 1 is a block diagram illustrating a conventional centralized video conference control architecture.

DETAILED DESCRIPTION OF EMBODIMENTS OF THE INVENTION

Figure 2:
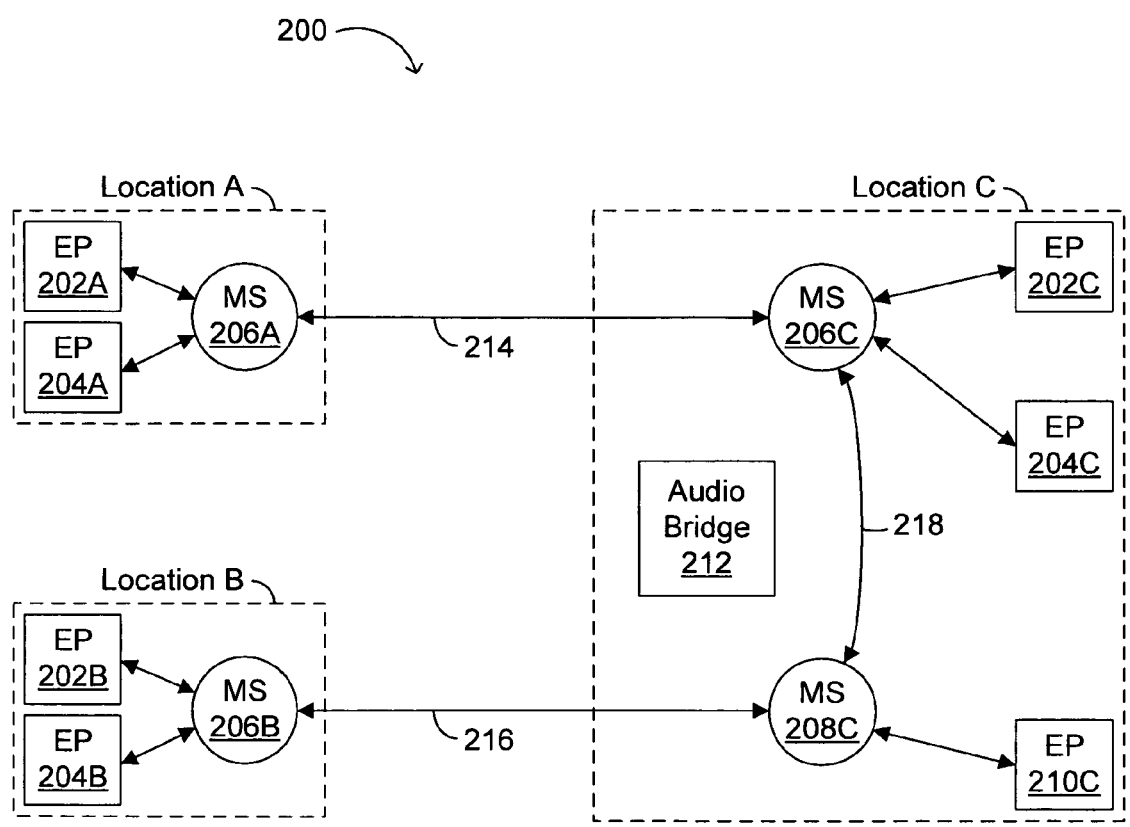
FIG. 2 is a block diagram illustrating an exemplary distributed multipoint control unit (MCU) architecture in accordance with embodiments of the present invention.

Embodiments of the present invention implement video conferencing architectures, structures, control systems, and/or methods for controlling a distributed video switching system. An exemplary system having devices and/or a structures in accordance with embodiments can include at least two endpoints coupled to a network via media switches where the media switches are able to switch from a multicast operation to a unicast operation in response to: (i) a signaling notification from a stream controller; and/or (ii) a notification embedded into a video stream.

In general, any type of hardware, software or combination thereof can be used with aspects of embodiments of the invention. Further, any type of network and/or communication link can be used. Also, any type of media conferencing or the like, such as video and/or audio may be used with aspects of embodiments of the invention.

For clarity, various well-known components, such as power supplies, some or portions of communications ports, routers, gateways, firewalls, and so on, have been omitted from the figures. However, those skilled in the art with access to the present teachings will know which components to implement and how to implement them to meet the needs of a given application.

In general, a distributed multipoint control unit (MCU) architecture in accordance with embodiments of the present invention can include geographically distributed components instead of the more centralized conventional approach. In facilitating this decentralized approach, switch/routers or the like may be configured with software to operate as media switches. Media switch functionality can include locally terminating video endpoint media and distributing incoming real time protocol (RTP) information based on conference policy, for example. Media can be forwarded between media switches and coordination between media switches can be provided by a controlling server.

A distributed video conferencing system in accordance with embodiments shows a previous speaker or a current speaker as determined by the loudest in the conference. In particular, the current speaker may be shown to all conference participants or "endpoints" on the network, except for the current speaker's monitor, which can show the previous speaker. Such approaches are typical in modern video conferencing systems in order to conserve bandwidth across the network (e.g., relative to older approaches where each participant sees all other participants) because video content consumes substantially more bandwidth than does corresponding audio content. Alternatively, a video conference can operate in another mode of operation, such as where the stream switching is done on a timer basis (i.e., "lecture mode") where what the lecturer sees is a rolling display of participants/students. As another alternative, some logic other than a loudest speaker approach may be used in accordance with embodiments of the present invention. For any such mode of operation, according to embodiments, control of the switching in a distributed video conferencing system can be done using media notifications.

In accordance with embodiments of the present invention, a media switch may be configured for use in a distributed video conference, and the media switch may include: (i) a first interface for a first type communication with an endpoint; (ii) a second interface for the first type communication with another media switch, where the second interface can receive a first video stream with a first characteristic and a second video stream with a second characteristic; (iii) a third interface for a second type communication with a stream controller, where the stream controller can provide a notification; and (iv) a fourth interface configured for the second type communication with a controlling server. The media switch can re-target an active stream in response to the notification or a difference between the first and second characteristics. The interfaces can be any type of interface suitable for sending and/or receiving signals on a network.

Referring now to FIG. 2, a block diagram illustrating an exemplary distributed multipoint control unit (MCU) architecture in accordance with embodiments of the present invention is indicated by the general reference character 200. Such an architecture or arrangement can be set up by a controlling server (not shown). The controlling server may control signaling by receiving messages (e.g., using SIP or Session Initiation Protocol) and then deciding which media switch (MS) and stream controller should be involved in the particular conference. For example, EP 202A and EP 204A may be particular conference rooms in location A, which is near or also containing MS 206, so the controlling server may group EP 202A, 204A, and MS 206A. Similarly, location B may include EP 202B, 204B, and MS 206B. All endpoints may be in the same video conference, even though the endpoints may be geographically distributed.

Communication channel 214 may allow interface between MS 206A and MS 206C. This channel may be any type of network structure, such as the Internet or a Virtual Private Network (VPN), configurable for multicast and/or unicast operation. Similarly, communication channel 216 may allow interface between MS 206B and MS 208C. Location C may also include EP 202C and EP 204C coupled to MS 206C, EP 210C coupled to MS 208C, and audio bridge 212. Further, communication channel 218 within location C may allow interface between MS 206C and MS 208C, for example. In this arrangement, MCU functionality can be distributed among the media switches configured in a video conferencing system to support event-based video switching.

The active speaker may be chosen as the loudest conference participant, as determined by audio bridge 212. Within a video conferencing session, audio may always be "on" whereby a participant may hear others in the conference, but their associated video may not be allowed through unless it is the loudest. To effectively accomplish this, audio bridge 212 may receive audio from all conference participants, but may ignore or filter out background noise by, for example, using a timer (e.g., about 2 seconds). This is to avoid repeatedly switching video streams for each and every loud noise. Accordingly, audio bridge 212 (which may also include or be coupled with an audio mixer) can include noise cancellation or other functions performed in a digital signal processor (DSP), for example.

Figure 3:
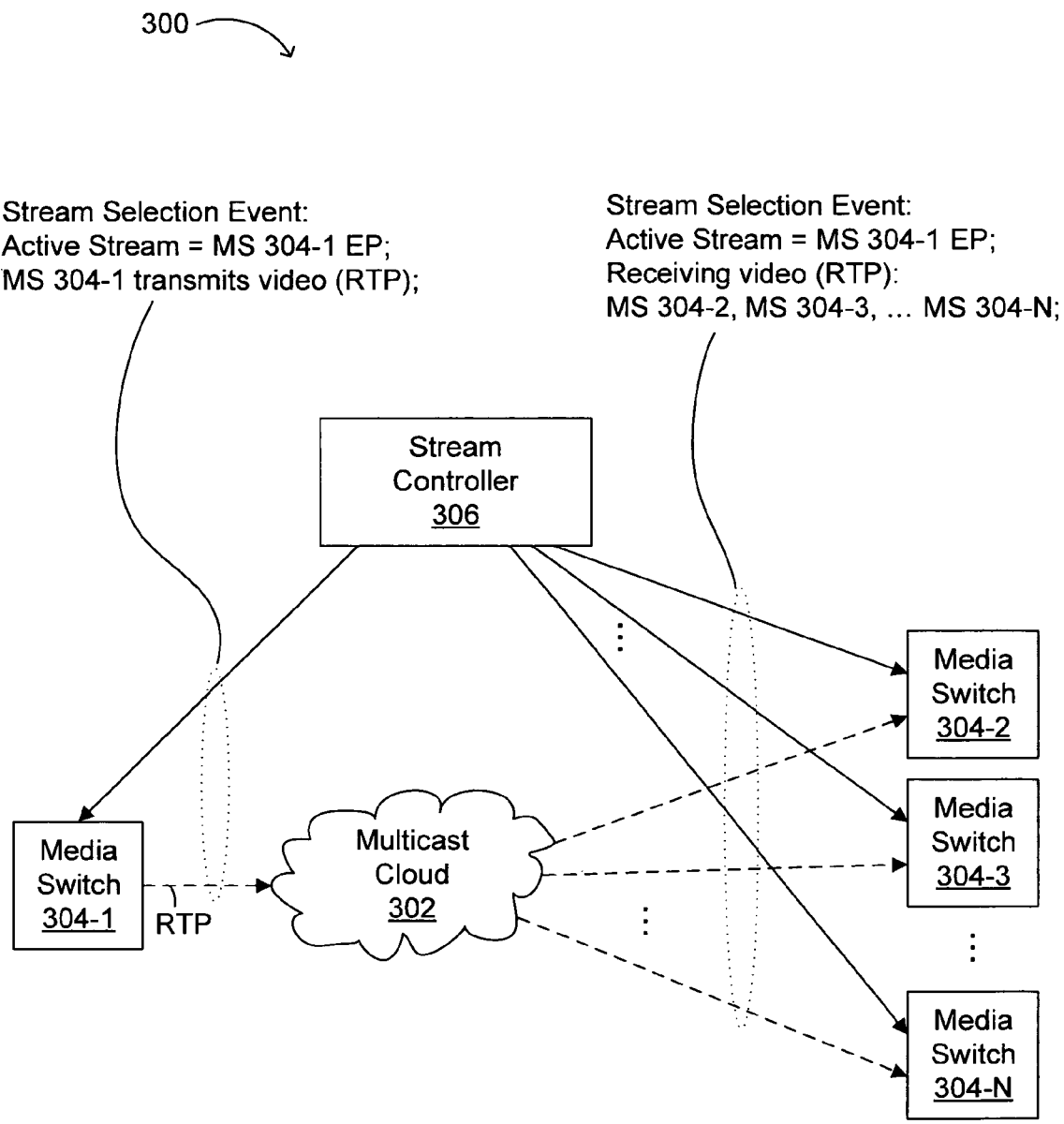
FIG. 3 is a block diagram illustrating an exemplary stream controller and multicast cloud arrangement in accordance with embodiments of the present invention.

Referring now to FIG. 3, a block diagram illustrating an exemplary stream controller and multicast cloud arrangement in accordance with embodiments of the present invention is indicated by the general reference character 300. In particular, a stream controller may decide the media forwarding, such as the media content that each participant in the video conference sees. The stream controller, based on input from an audio mixer (e.g., audio bridge 212 of FIG. 2), may convey to each media switch forwarding instructions for the media (e.g., video) streams.

Media switch (MS) 304-1 can be configured to send video content in real time protocol (RTP) format via multicast cloud 302 to other media switches (MS) 304-2, 304-3, . . . 304-N. Stream controller 306, on the other hand, can operate in an out-of-band signaling format, such as SIP or the like, to notify the media switches of a change in active speaker endpoint, for example. The media switches may generally terminate endpoints video streams. The stream controller can control the turning-on or off of video streams onto the network by means of messages sent to the media switches. The media switches can generally act as gates, and can basically know there are streams to be terminated (e.g., at endpoints (not shown)) and the stream controller can communicate to them the target locations of the streams. In essence, the media switches may only pass through video (e.g., RTP content) once they are told by the stream controller to do so.

For example, stream controller 306 may, in a stream selection event, tell MS 304-1 that an associated endpoint is the new active speaker. Thus, the active stream is an MS 304-1 endpoint (EP). MS 304-1 may then transmit video in RTP format through multicast cloud 302. MS 304-2, 304-3, . . . 304-N may know that the new active stream is an MS 304-1 EP, and may first receive this notification by the faster of: (i) a signaling notification from a stream controller; and/or (ii) a notification embedded into a video stream (e.g., RTP content via multicast cloud 302). Further, because these two notification mechanisms use different paths (e.g., signaling versus media paths), it is likely that the two notifications will arrive at a particular media switch at different times. Accordingly, it is advantageous to allow for both notification mechanisms in a high performance video conferencing system.

A stream controller generally knows which endpoint or conference room contains the loudest participant at any given point in the conference, so the stream controller can notify the media switch terminating the previous speakers stream (i.e., the last loudest or active speaker) not to send video onto multicast cloud 302. Thus, the previous speaker's video can be switched off and no longer distributed to the main participants. Typically, multicast cloud 302 may, at any point in time during a conference session, have only one stream multicasting. Such multicasting can be outgoing from a media switch to all other media switches on the network (e.g., from MS 304-1 to MS 304-2, 304-3, . . . 304-N). Thus, systems utilizing a multicast cloud in accordance with embodiments may be scalable to accommodate large conferences because the multicasting can be done regardless of the size of the conference. This would not be feasible in a system having purely unicast type connections because the bandwidth requirements would be directly proportional to the number of media switches and/or endpoints in the system.

Figure 4:
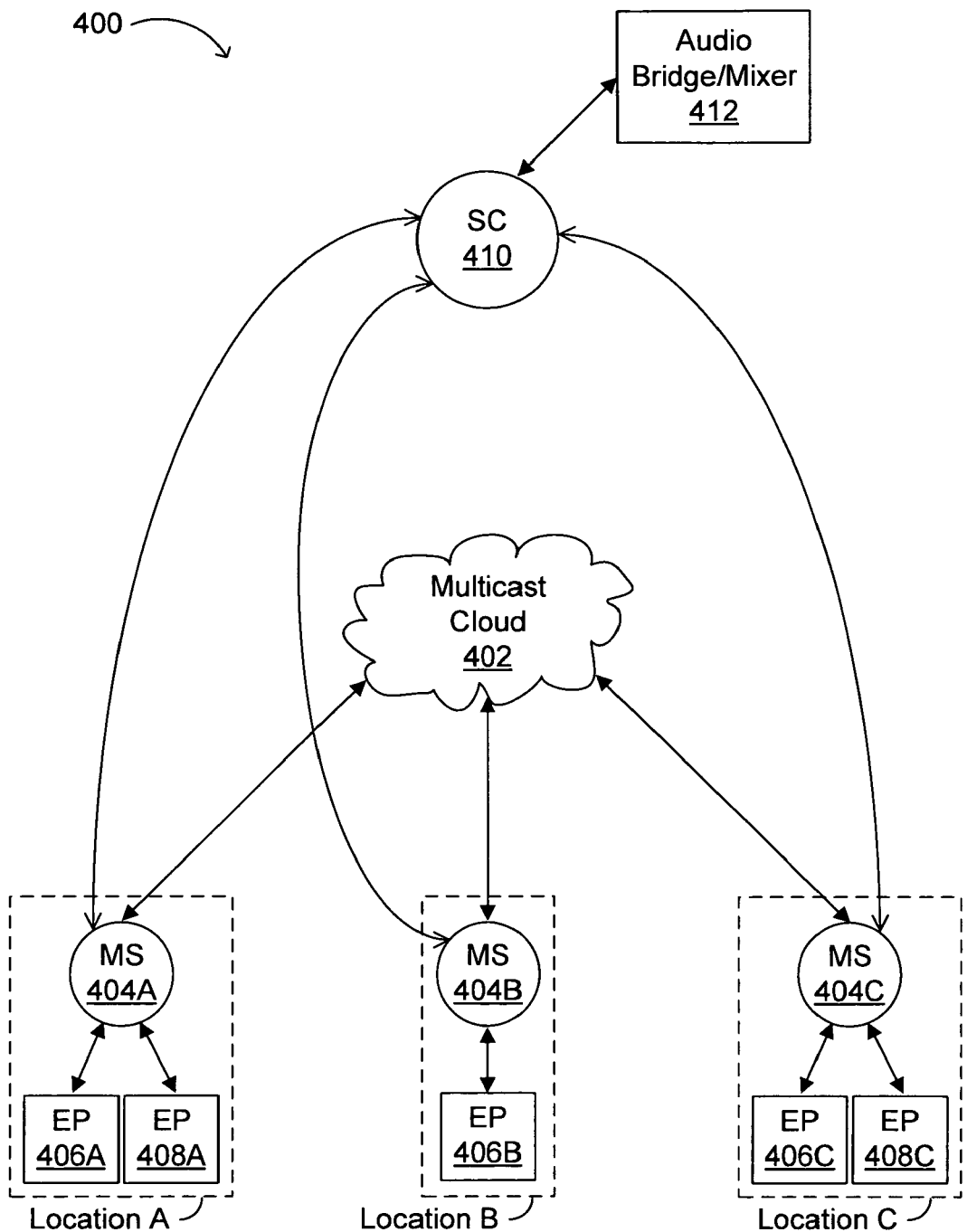
FIG. 4 is a block diagram illustrating an exemplary endpoint and stream controller arrangement in accordance with embodiments of the present invention.

Referring now to FIG. 4, a block diagram illustrating an exemplary endpoint and stream controller arrangement in accordance with embodiments of the present invention is indicated by the general reference character 400. Media switches (e.g., MS 404A, 404B, and 404C) may be switch/routers that can be located in branch offices, for example. Audio bridge/mixer 412 and stream controller (SC) 410 may be located in a main office, for example. Further, base switch/routers can be configured by using software to operate as a media switch or a stream controller in a particular application.

In this particular example, when media switch (MS) 404A is currently servicing an active speaker stream (e.g., from EP 406A or 408A), and may receive notification indicating a video stream switch to MS 404B (e.g., to video from EP 406A) before MS 404B has received the notification. In this case, MS 404A can stop forwarding its media to the active speaker multicast group (e.g., via multicast cloud 402) before MS 404B has started distributing its stream. In conventional approaches, such a situation can cause a disruption in the video as viewed by participants in the video conference. Further, because MS 404B may need to request and then wait for an intra-frame or I-frame coming from its endpoint before starting to transmit its stream on the active speaker multicast, the disruption may be lengthened as a result. Generally, when presenting a stream from a new source, the I-frame is sent as the first frame, since it contains a full image or a decodable picture. Subsequent frames may contain only updates to the initial frame (e.g., difference information between a current and previous pictures). If this is not handled correctly, stream transitions with corrupted and/or "blocky" images may result.

In an exemplary video conferencing system, when a speaker change occurs, the current speaker can move to the previous speaker position, and a new speaker can be identified. According to embodiments of the present invention, a media switch that is distributing the current speaker stream can utilize two methods of notification of an end to providing the active speaker: (i) an in-band media event (e.g., in a video stream); and/or (ii) a notification from the stream controller (e.g., SC 410). The in-band media event can be used if the media switch in question is receiving the media corresponding to the active speaker.

For example, in FIG. 4, SC 410 may be an entity (e.g., a switch/router configured by software to operate as a stream controller) that knows all of the participants in a video conferencing session, which endpoint is the active speaker, which endpoint is the previous/last speaker, etc. Accordingly, SC 410 can notify the media switches (e.g., MS 404A, 404B, and 404C) that a specific endpoint (e.g., 406A, 408A, 406B, 406C, or 408C) is the active speaker, and instruct the owning media switch to send that stream out via multicast cloud 402. Further, SC 410 can have the media switch associated with the previous speaker send that previous speaker stream to the new active speaker (e.g., by unicast instead of multicast).

A relationship between the media switches and the stream controller can be established by a controlling server (not shown in FIG. 4) upon set up of the video conference structure, participant locations, and the like. Further, audio bridge/mixer 412 can be used to convey to SC 410 that one of endpoints 406A, 408A, 406B, 406C, or 408C, is the new loudest speaker, "EP X." SC 410 can then determine the location of X and which media switch is associated with EP X. For example, if X is EP 406A or 408A, MS 404A can be identified; if EP X is EP 406B, MS 404B can be identified; if EP X is EP 406C or 408C, MS 404C can be identified. Once the proper media switch is identified, SC 410 can send a message (e.g., a signaling message using SIP protocol) to the appropriate media switch, notifying the media switch that EP X is the active speaker.

Whenever a new active speaker is to be shown across the video conferencing session, a request can be sent to EP X for an I-frame. This request can be sent by a controlling server (not shown) that may also set up the video conference session, as will be discussed in more detail below. Generally, an I-frame can represent a complete picture or a baseline for the video stream, where the complete picture may be "decoded" without relying on another picture. In addition to I-frames, P-frames, which can represent a difference between the baseline and an update and which may need a previous picture for decoding, can be sent periodically. P-frames may also require less bandwidth than an I-frame. For example, an I-frame may be sent once upon an active speaker change and then P-frames could be sent thereafter. More typically, however, I-frames can also be sent periodically (in addition to upon active speaker change), but at a slower rate than the P-frame updates. Further, in some applications, B-frames, which can interpolate between P-frames (thus consuming even less memory and bandwidth than a P-frame) can also be used.

Figure 5:
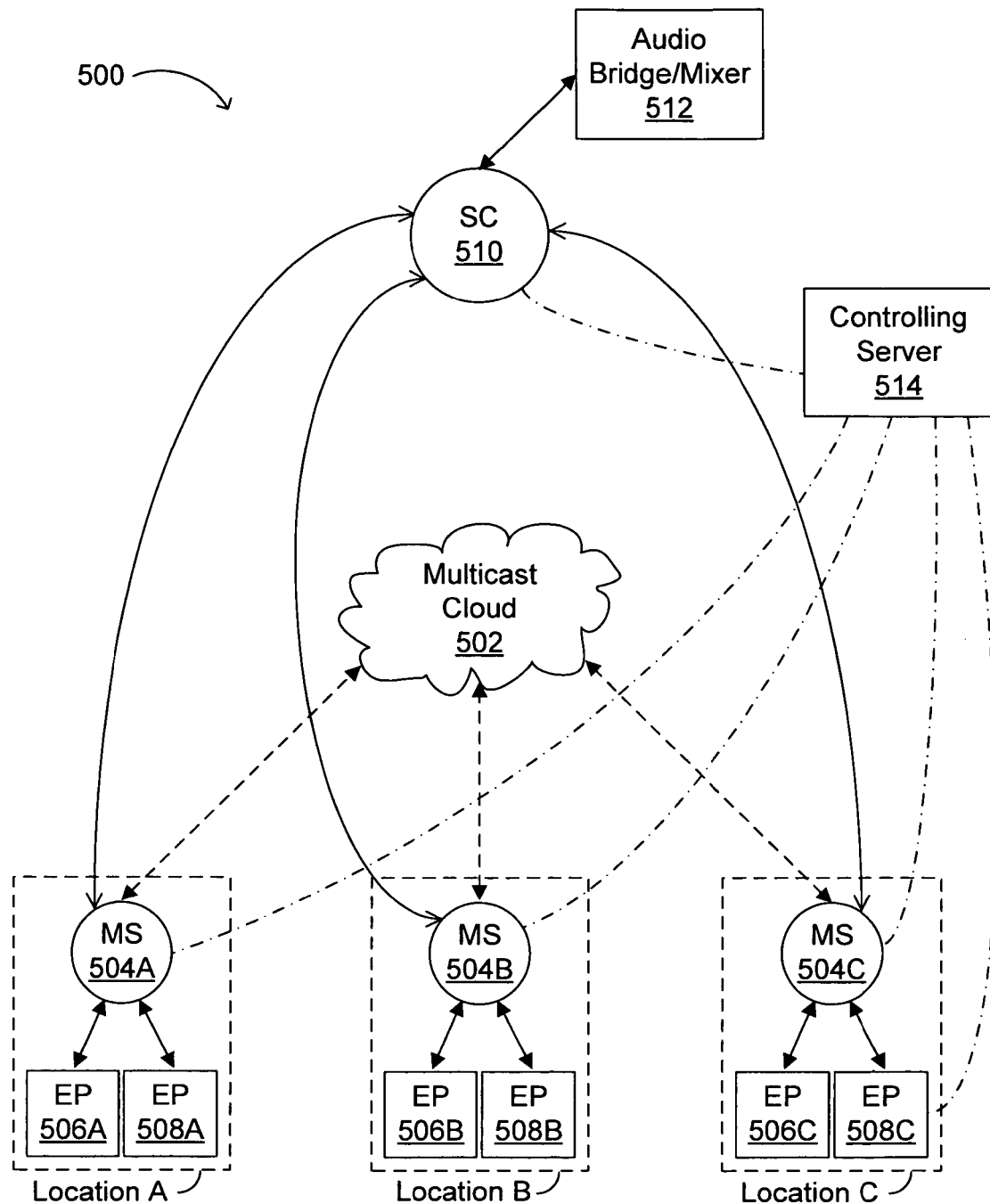
FIG. 5 is a block diagram of a decentralized video conference control architecture in accordance with embodiments of the present invention.

Referring now to FIG. 5, a block diagram of a decentralized video conference control architecture in accordance with embodiments of the present invention is indicated by the general reference character 500. An overall controlling entity can be controlling server 514. Controlling server 514 may control signaling (e.g., using "SIP" protocol) and setup of the infrastructure of the video conference. For example, when a new participant calls in (e.g., from a specific endpoint) to the video conference, the new participant can be assigned a geographically-based media switch. In particular, the endpoints (e.g., EP 506A, 508A, 506B, 508B, 506C, and 508C) can send SIP messages to controlling server 514 and controlling server 514 can decide which media switch and stream controller should be involved and appropriately configured for the conference. In the example of FIG. 5, stream controller (SC) 510 and audio bridge/mixer 512 can be dedicated for the conference. Further, media switch (MS) 504A can be assigned EP 506A and 508A, MS 504B can be assigned EP 506B and 508B, and MS 504C can be assigned EP 506C and 508C, for example.

When the active speaker is to be switched, controlling server 514 can request the new active speaker ("EP X") to send an I-frame to provide a complete picture. In particular, whenever a speaker change occurs, a particular media switch can request an I-frame from EP X. According to embodiments, such a request can be sent to controlling server 514, and then that I-frame request can be sent to EP X (e.g., EP 508C). In some applications, each endpoint in a system may not even know it is in a conference, but rather each endpoint may be simply configured to act on requests or orders from SC 510, for example. In general, the media switches may have a "media" relationship with its assigned endpoints, but not a "signaling" relationship. Accordingly, to send an I-frame, the signaling can function through controlling server 514, for example. So, each media switch can terminate the actual video stream from its assigned endpoints, but the signaling that may be required for such configuration can go through controlling server 514.

As discussed, when a media switch receives notification that one of its assigned endpoints ("EP X") is the new active speaker, that media switch can send a SIP signaling message to controlling server 514 and convey that an I-frame is needed from EP X. Because controlling server 514 can have a signaling relationship with EP X, controlling server 514 can send EP X a signaling request to send the I-frame out. The assigned media switch can be waiting for and expecting the I-frame from EP X because this media switch made the initial I-frame request to controlling server 514. Once the assigned media switch receives this I-frame, the I-frame can be sent to all other media switches (e.g., via multicast cloud 502). However, the current active speaker (EP X) only needs to continue to see the previous speaker, so the assigned media switch can disallow that I-frame from getting through to EP X. Instead of EP X receiving the current speaker's stream via multicast, EP X may now receive the stream via unicast. Further, EP X may not receive an I-frame in this situation because EP X was already receiving the stream prior to the change in active speaker.

When a request for an I-frame is sent from controlling server 514 to EP X and then EP X generates the I-frame, there is inherent delay in the system because of the signaling. SC 510 can notify all the media switches that EP X is the active speaker and if the media switch that EP X's stream terminates to can identify EP X, then that media switch can ask controlling server 514 to send an I-frame request. According to embodiments, the previous speaker's media switch can send a unicast stream to the new active speaker's media switch, and multicast cloud 502 can be used primarily for the active speaker. Accordingly, in going from the active to the previous speaker, a media switch can: (i) switch from multicast cloud 502 to unicast (e.g., using all P-frames) communication; and (ii) refrain from sending the stream unicast until the media switch has received the new active speaker stream via multicast cloud 502, thus ensuring a substantially clean stream transition.

According to embodiments, because signaling notification might get lost or might take more time because SC 510 may be located far from a particular media switch, causing delay, such delay can be substantially eliminated by having the notification sent through the media stream in addition to via signaling. Essentially, in case a media switch doesn't receive the notification prior to receiving the new video stream (because signaling is typically slower than the actual media), video can be switched upon receiving the first notification, according to embodiments. In general, while each media switch can always monitor multicast cloud 502, the only media switch that must alter its operation is the one assigned the previous speaker because that media switch can change from multicast to communicate in unicast fashion to the new active speaker's media switch.

In one aspect of embodiments of the present invention, a method can be used to synchronize active speaker switches between media switches by leveraging in-band media signaling (e.g., in the video stream) in conjunction with signaling from a controlling server. Accordingly, a video system user can experience a "smooth" video stream transition while the system is switching from one speaker to another.

Figure 6:
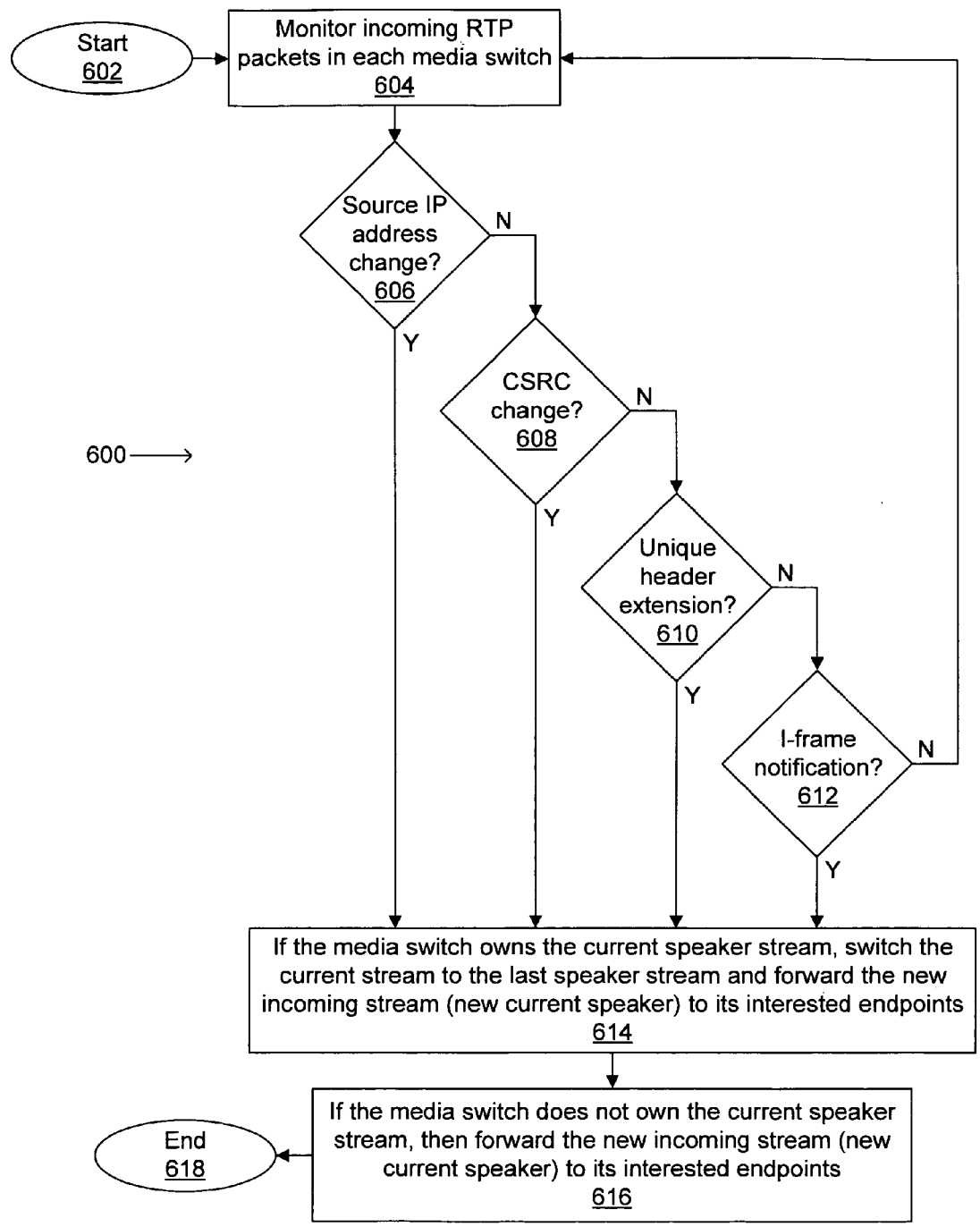
FIG. 6 is a flow diagram illustrating an exemplary method for media switch stream re-targeting control in accordance with an embodiment of the present invention.

Referring now to FIG. 6, a flow diagram illustrating an exemplary method for media switch stream re-targeting control in accordance with an embodiment of the present invention is indicated by the general reference character 600. The flow can begin (602) and each media switch can monitor incoming RTP packets (604). The packets can be monitored for changes in the media characteristics as well as notifications from the stream controller. One or more of the following identification techniques may be used to determine when a media switch should activate a re-targeting: (i) packets having a different source IP address via the multicast cloud; (ii) packets having a different contributing source ID (CSRC); (iii) packets having a unique RTP header extension; and/or (iv) notification via I-frame. These identification techniques can allow a receiving media switch to distinguish stream transition I-frames from I-frames routinely sent from an endpoint, but not representing a stream transition, for example.

Different situations or applications may have different preferred identification techniques for determining a re-targeting activation. For example, if there is a lost notification or the like and a particular media switch is currently getting two streams, the different source IP address change may be the preferred. CSRC may be a field in an RTP (e.g., video and audio packets) packet header and this CSRC can be the IP address of the endpoint currently actually sending video, or some similar identifier. But, the IP address seen by a media switch may be the address of another media switch and not of the endpoint. Accordingly, the different source IP address identification technique may not work if the active speaker change is within the same media switch assignment structure.

But, in this case, a different CSRC identification technique can work. For the unique header extension, the edge media switch may mark the first I-frame of the new active speaker to indicate the active speaker switch. This can distinguish from the periodic I-frames being sent without such a marker, for example.

In the example of FIG. 6, if there is a change in the source IP address (606), a CSRC change (608), a unique header extension (610), or an I-frame notification (612), the re-targeting can be activated (614/616). If the media switch owns the current speaker stream, the media switch can change the current stream to the last speaker stream and can forward the new incoming (current speaker) stream to its interested endpoints (614). On the other hand, if the media switch does not own the current speaker stream, then the media switch simply forwards the new incoming (current speaker) stream to its interested endpoints (616) and the flow can complete (618). If none of the characteristics and/or notifications, as indicated in decision boxes 606, 608, 610, and 612, are encountered by a particular media switch, the flow can return to box 604 and continue to monitor incoming RTP packets.

In this fashion, a media switch currently serving an active speaker stream may re-target its media stream after the media switch serving the newly-selected active speaker has started distributing its stream into the active speaker multicast cloud. Such an approach in accordance with embodiments of the present invention can ensure that there is no substantial disruption in the video viewed by conference users during active speaker switching. Algorithms and/or methods in accordance with embodiments may also ensure that media switches that are not receiving an active speaker will be able to re-target their streams based on stream controller notifications.

Accordingly, embodiments of the present invention pertain to the use of media-level notifications for active speaker switches and include advantages of: (i) substantial elimination of video disruption during active speaker switching; and (ii) providing a backup mechanism to out-of-band notifications. Further, in a distributed environment, synchronization of media event signaling is of particular importance. In another aspect of embodiments of the present invention, a signaling mechanism is provided at the media layer such that no additional packet overhead and/or standards violation is presented.

Embodiments of the present invention can be used for any application that involves distributed media interchange, distribution, or conferencing, such as video conferencing, where media (e.g., video) streams may be forwarded and receivers need to gain awareness of transitions to new speakers.

While embodiments herein have been discussed with reference to video conferencing, embodiments of the present invention are not limited thereto. For example, many other types of media and associated interchange or communication may be used in accordance with embodiments of the present invention. Further, specific network arrangements and configurations shown herein are merely exemplary and one skilled in the art will recognize that other variations may be used in accordance with embodiments. Accordingly, variations and embodiments other than those discussed herein are possible.

Although embodiments of the invention are discussed primarily with reference to specific examples, any acceptable architecture, topology, protocols, network arrangement, forms of media, distribution arrangements, or other network and/or digital processing features can be employed. In general, network controllers, managers, access points, clients, and so on, can be implemented via any device with processing ability or other requisite functionality. It is also possible that functionality relevant to embodiments of the present invention can be included in a router, switch and/or other integrated device.

Although processes of the present invention, and the hardware executing the processes, may be characterized by language common to a discussion of the Internet (e.g., "client," "server," "peer") it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing or media presentation device can be used as a-device suitable for a network connection as an endpoint. For example, portable computing devices such as a personal digital assistant (PDA), cell phone, laptop computer, or other devices can be employed. In general, the devices and manner of specific processing (including location and timing) are not critical to practicing important features of embodiments of the present invention.

Although embodiments of the present invention have been discussed primarily with respect to video conferencing associated with a network, such as the Internet, any suitable network, network topology, transmission protocols, sender-receiver devices and relationships, and other characteristics or properties of electronic devices, processes and transmission methods can be used. For example, features of the invention can be employed on various scales and in various applications, including local area networks (LANs), campus or corporate networks, home networks, etc.

Although the invention has been discussed with respect to specific embodiments thereof, these embodiments are merely illustrative, and not restrictive, of the invention. Embodiments of the present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data, may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a ", an and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A media switch configured for use in a distributed video conference, the media switch comprising:
a first interface configured for a first type communication with an endpoint;
a second interface configured for the first type communication with another media switch, the second interface being configured to receive a first video stream having a first characteristic and a second video stream having a second characteristic;
a third interface configured for a second type communication with a stream controller, the stream controller being configured to provide a notification; and
a fourth interface configured for the second type communication with a controlling server,
whereby the media switch is configured to re-target an active stream in response to the notification or a difference between the first and second characteristics.

2. The media switch of claim 1, wherein the media switch includes a router configured by software.

3. The media switch of claim 1, wherein the first type communication includes in-band media.

4. The media switch of claim 3, wherein the in-band media includes real time protocol (RTP).

5. The media switch of claim 1, wherein the second type communication includes a signaling protocol.

6. The media switch of claim 5, wherein the signaling protocol includes session initiation protocol (SIP).

7. The media switch of claim 1, wherein the difference between the first and second characteristics includes packets having a different source IP address.

8. The media switch of claim 1, wherein the difference between the first and second characteristics includes packets having a different contributing source (CSRC).

9. The media switch of claim 1, wherein the difference between the first and second characteristics includes packets having a unique real time protocol (RTP) header extension.

10. The media switch of claim 1, wherein the difference between the first and second characteristics includes an I-frame.

11. A method of controlling streams in a distributed video conference, the method comprising:
monitoring packets of a first type protocol in a media switch;
identifying a stream change using one or more identification techniques applied to the monitored packets;
changing a current speaker stream to a last speaker stream when the media switch owns the current speaker stream; and
forwarding an active speaker stream to one or more endpoints.

12. The method of claim 11, wherein the one or more identification techniques includes finding packets having a different source IP address.

13. The method of claim 11, wherein the one or more identification techniques includes finding packets having a different contributing source (CSRC).

14. The method of claim 11, wherein the one or more identification techniques includes finding packets having a unique real time protocol (RTP) header extension.

15. The method of claim 11, wherein the one or more identification techniques includes notification via an I-frame.

16. The method of claim 11, further including monitoring notification in a second type protocol.

17. The method of claim 16, wherein the second type protocol includes session initiation protocol (SIP).

18. The method of claim 16, wherein the stream change is identified using a faster of the one or more identification techniques and the notification.

19. The method of claim 11, wherein the stream change is in response to a loudest speaker in the distributed video conference.

20. The method of claim 11, wherein the first type protocol includes in-band media.

21. The method of claim 20, wherein the in-band media includes real time protocol (RTP).

22. The method of claim 11, further including sending a unicast transmission from a last speaker location to an active speaker location.

23. A computer readable medium on which is stored a sequence of instructions that, when executed by one or more processors, causes the processors to perform the method of:
controlling streams in a distributed video conference, the method comprising:
monitoring packets of a first type protocol in a media switch;
identifying a stream change using one or more identification techniques applied to the monitored packets;
changing a current speaker stream to a last speaker stream when the media switch owns the current speaker stream; and
forwarding an active speaker stream to one or more endpoints.

24. The computer readable medium of claim 23, wherein the one or more identification techniques includes finding packets having a different source IP address.

25. The computer readable medium of claim 23, wherein the one or more identification techniques includes finding packets having a different contributing source (CSRC).

26. The computer readable medium of claim 23, wherein the one or more identification techniques includes finding packets having a unique real time protocol (RTP) header extension.

27. The computer readable medium of claim 23, wherein the one or more identification techniques includes notification via an I-frame.

28. The computer readable medium of claim 23, further including monitoring notification in a second type protocol.

29. The computer readable medium of claim 28, wherein the second type protocol includes session initiation protocol (SIP).

30. The computer readable medium of claim 28, wherein the stream change is identified using a faster of the one or more identification techniques and the notification.

31. A means for controlling streams in a distributed video conference, comprising:

- a means for monitoring packets of a first type protocol in a media switch;
- a means for identifying a stream change using one or more identification techniques applied to the monitored packets;
- a means for changing a current speaker stream to a last speaker stream when the media switch owns the current speaker stream; and
- a means for forwarding an active speaker stream to one or more endpoints.

* * * * *